United States Patent Office 3,785,948
Patented Jan. 15, 1974

---

3,785,948
ELECTROCHEMICAL OXYGEN DETECTOR
Michael L. Hitchman, Wolfgang Mehl, and Jean Pierre Millot, Geneva, Switzerland, assignors to H. Dudley Wright, Cologny, Geneva, Switzerland
Filed Feb. 14, 1972, Ser. No. 226,037
Int. Cl. G01n 27/46
U.S. Cl. 204—195 P        11 Claims

ABSTRACT OF THE DISCLOSURE

An electrochemical oxygen detector which is useful in a sulfurous environment contains a metal sulfide, such as nickel, tungsten or cobalt sulfide, as a cathode. The anode is desirably silver sulfide. A detector having a nickel sulfide or a tungsten sulfide cathode and a silver sulfide anode is readily formed during use in a polluted environment from a detector having a nickel or a tungsten cathode and a silver anode without substantial variation in response characteristics. The electrolyte is desirably potassium chloride in water containing a chelating agent for reducible metal ions, for example sodium potassium tartrate, a buffer to maintain the pH in excess of 5, and a deliquescent agent, e.g. a mixture of potassium dihydrogen phosphate and disodium hydrogen phosphate dihydrate.

---

Figure 1:
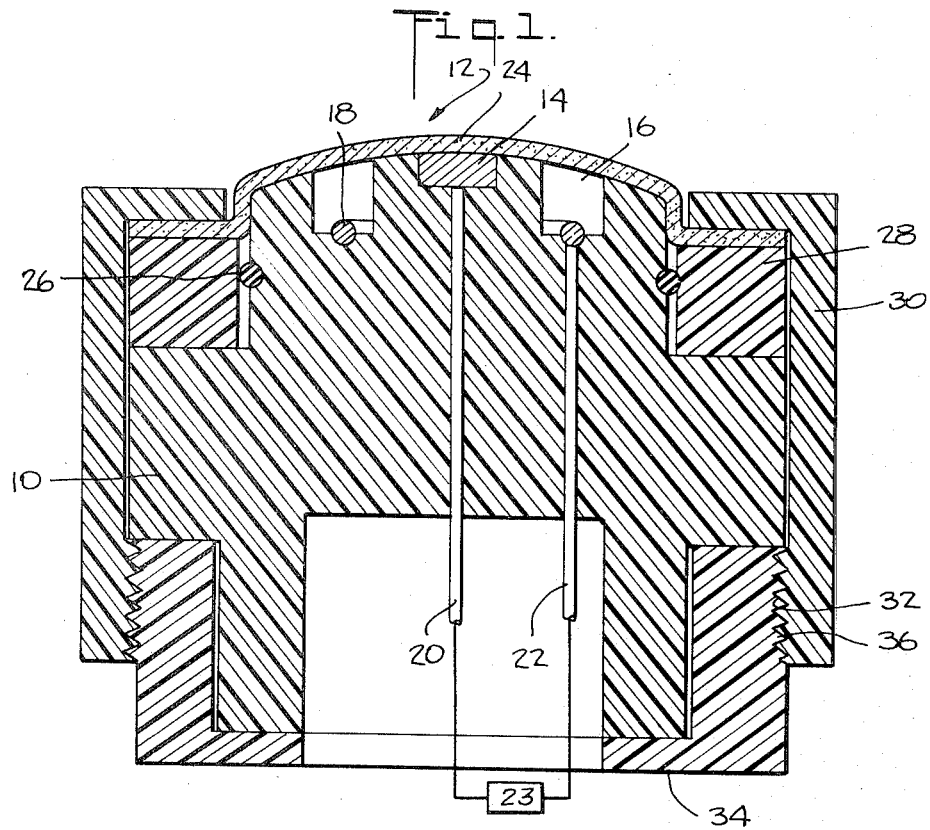

This invention is concerned with a device for determining the oxygen content of fluids. More particularly, this invention relates to an electrochemical device for determining the oxygen content of fluids contaminated with sulfur compounds such as hydrogen sulfide, sulfur dioxide or mercaptans. Still more particularly, this invention relates to an electrochemical oxygen detector whose performance characteristics are not adversely affected by the presence of sulfur-containing contaminants.

Electrochemical sensors for determining the oxygen content of gases and liquids have been known for many years. These devices comprise as a working electrode a cathode at which oxygen is reduced, an auxiliary electrode, or anode, and an electrolyte solution providing electrical contact between the electrodes. The device is placed in the fluid whose oxygen content is to be measured and oxygen from the fluid is allowed to dissolve in the electrolyte. When a potential is applied across the electrodes, a current results whose magnitude is proportional to the oxygen content of the electrolyte, which in turn is proportional to the oxygen content of the fluid. Oxygen detectors of this type have been disclosed, for example, by Clark in U.S. Pat. No. 2,913,386, by Okun et al. in U.S. Pat. No. 3,227,643 and by Molloy in U.S. Pat. No. 3,406,109, and typically comprise a body having a cathode in the surface, a thin film of electrolyte over the cathode surface in electrical contact with an anode and a gas-permeable membrane between the electrolyte and the fluid to be analyzed.

A disadvantage which is common to all commercially-available detectors of this type is their inability to be used in fluids containing sulfur compounds. In general, the working electrode or cathode of these detectors has been made of silver or gold, and if a sulfur compound is present in the fluid being analyzed, it will react with the cathode metal to form a metal sulfide coating, thus poisoning the cathode surface and rendering the detector unfit for use. As a result, these detectors are of limited use in environments such as stagnant sea water or sewage treatment basins, where hydrogen sulfide generated by the reduction of sulfate ions by anaerobic bacteria is present, or in other sulfurous environments, such as those containing oxides of sulfur or mercaptans. That is, they must be constantly recalibrated as the poisoning of the electrode proceeds, and ultimately must be cleaned to restore useful activity.

In an effort to solve this problem, it has been proposed to interpose a laminar membrane structure between the electrode and the atmosphere, one layer of which comprises a solution of a compound, such as cadmium nitrate, which reacts with the sulfur contaminant ($H_2S$) before it can reach the cathode. Thus, Schmid et al., in Chimia 23, pp. 398–9 (1969) propose a cadmium nitrate layer and a second membrane superimposed over the first membrane and electrolyte layer. These additional layers are undesirable, however, because the increased distance the oxygen must travel to reach the cathode increases the response time of the detection device. Another suggested approach has been to employ a liquid mercury electrode which is constantly being renewed by addition of mercury, an approach which has proven to be impractical.

It is an object of this invention to provide an improved electrochemical oxygen detector.

It is a further object of this invention to provide an electrochemical oxygen detector which is not susceptible to undesirable poisoning by sulfur compounds.

Still a further object of this invention is to provide an electrochemical detector which is resistant to adverse sulfur contamination and yet is simple in structure and has a high degree of sensitivity.

These and other objects of the present invention, which will be apparent from the specification, drawings and claims, are achieved through the use of a metal sulfide as the cathode of the oxygen detector. Metal sulfides which have been found useful are the sulfides of nickel, tungsten and cobalt.

The physical structure of the sensing device is not critical to the present invention, and the metal sulfide cathode can be used in any of the known sensing devices, or modifications thereof.

Figure 2:
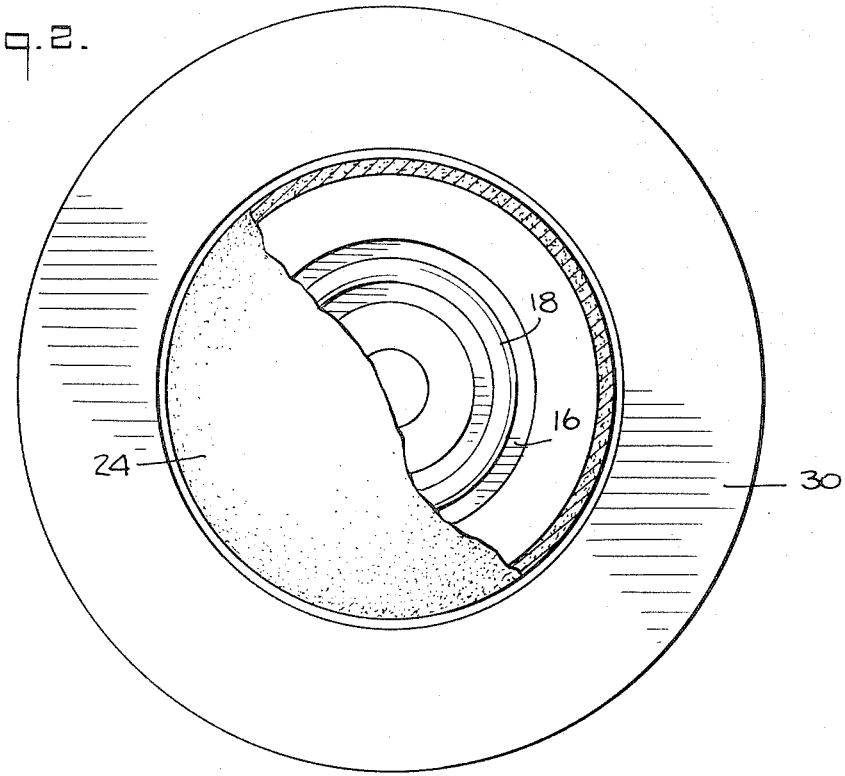

A particularly preferred structure is shown in FIGS. 1 and 2 of which:

FIG. 1 is a cross-sectional side view; and
FIG. 2 is an end view, in partial cross-section.

The device comprises body 10, comprised of an electrically and chemically inert material, having a rounded end 12 and, in the center of rounded end 12, metal sulfide cathode 14. Rounded end 12 is also provided with annular groove 16, in the bottom of which annular anode 18 is located. Cathode 14 and anode 18 are connected through leads 20 and 22, respectively, to an external power supply and the circuitry necessary to record the oxygen concentration, as represented by current flow, as denoted generally by numeral 23.

Rounded end 12 is surmounted by semi-permeable membrane 24 affixed to body 10 by suitable means, e.g. an O-ring, or more preferably by the clamping collar arrangement shown. This arrangement comprises O-ring 26, collar 28, a first clamping member 30 having internal screw threads 32, and a second clamping member 34 having external screw threads 36. As is apparent, upon tightening the clamping members, first clamping member 30 cooperates with collar 28 to firmly hold membrane 24 and form a liquid-tight seal. A suitable electrolyte is disposed between rounded end 12 and membrane 24 and in annular groove 16, thus affording electrical contact between cathode 14 and anode 18. This device is employed as an oxygen detecting probe in known manner.

It is not essential that the device of this invention be initially fabricated with a metal sulfide cathode. Indeed, because metal sulfides are much more difficult to work with than metals, it is desirable to fabricate the device with a metal cathode, and then expose the device to a sulfurous atmosphere to form a metal sulfide film in situ over the exposed surface of cathode 14. This exposure may be effected as a part of the manufacturing operation, or it may be effected during actual use of the detector.

Ordinarily the exposure to the sulfurous atmosphere will be carried out prior to use to avoid the variations in response characteristics resulting during formation of the metal sulfide film. It has been found, however, that when the cathode is initially formed of nickel or tungsten, the anode is initially formed of silver, and both anode and cathode are exposed to a sulfurous environment, sulfide films form at the anode and the cathode with little or no change in the sensitivity of the device. Apparently the changes in electrochemical properties resulting from the formation of the sulfide films at anode and cathode just balance each other so that no observable change in the sensitivity of the device occurs. As a result, a device having nickel or tungsten cathode and an exposed silver anode can be used without the need for recalibration. In all other cases for example if cobalt is the initial cathode material, or silver is not used as the anode, or the silver is not exposed to the atmosphere, it is desirable to preform the metal sulfide film to avoid the need to recalibrate the apparatus until the sulfide film has formed.

Except for the use of a metal sulfide cathode, and optionally a metal sulfide anode, the size, arrangement and composition of the components of the detector device are not a part of this invention. It is preferred, however, that the device have the physical arrangement of components as illustrated in FIGS. 1 and 2, and that the dimensions be such that the device has a useful response time and life of use.

For example, the metal sulfide cathode should be of a size such that the current resulting from oxygen reduction is great enough to be accurately measured, and yet not so great as to consume the electrolyte and anode materials too rapidly. A surface area of about 0.1 square centimeter, which supports a current of about 1 $\mu a.$, has been found suitable for general use, although greater or smaller areas may be employed in particular cases.

Since the anode is consumed during use, there should be sufficient anode material present so that the life of the detector is not limited by exhaustion of the anode material. At a current level of 1 $\mu a.$, at least $10^{-1}$ grams of silver are necessary to assure continuous operation for about one year, and an amount of about 1 gram is desirable.

The membrane should be formed of a semi-permeable material, i.e. a material which transmits gases but not liquids, such as polyethylene, polypropylene, poly(tetrafluoroethylene) and the like, having suitable structural strength and inertness to permit use of the device in the intended environment. It is desired, however, that the membrane be sufficiently thin that the device is sensitive to changes in oxygen concentration, i.e. that the time required for diffusion of oxygen through the membrane is small. In general, membrane thicknesses of 10–100$\mu$ have been found useful.

The electrolyte which is employed must have a high level of conductivity, and should provide an anion suitable for a reference electrode (the anode) having a well defined potential. When silver is the anode, the anion can be chloride, and when lead is the anode, the anion can be sulfate. A preferred electrolyte salt for use with a silver anode is potassium chloride.

The concentration of the electrolyte salt and the amount of the electrolyte solution should be such that the electrolyte has the desired conductivity and the device has a useful life. That is, since the anion of the electrolyte salt is consumed by reaction with the anode material, there must be sufficient salt to afford a useful life. A solution of 2–3 M potassium chloride in a volume of about 0.5 ml. would afford a useful conductivity and life.

The thickness of the electrolyte film in the central area bounded by the annular groove 16 should be such that the transport of oxygen from the fluid being analyzed to cathode 14 is controlled essentially by membrane 24. Since the diffusion of oxygen through membrane materials, such as are mentioned above is, in general, two or three orders of magnitude slower than diffusion of oxygen through electrolyte solutions, such as are mentioned above and below, the thickness of the electrolyte film need be no greater than the thickness of the membrane in order for transport through the membrane to be controlling.

Lastly, the length of the electrolyte film, i.e. the radial width of the annulus bounded by cathode 14 and annular groove 16, should be sufficient to prevent transport of loose anode particles to cathode 14 and yet not so great that the ohmic resistance of the cell is unduly high. Ordinarily a land length of from about 1 to about 10 mm. is suitable.

Although a solution of KCl has been found useful as the electrolyte solution, it is highly desirable to include chelating agents, buffers and agents which retard the evaporation of the water through membrane 24. Chelating agents are desirable to complex with trace reducible metal ions, e.g. silver, copper and nickel ions, which may be present in the electrolyte and otherwise give rise to a residual current not due to oxygen transport. Sodium potassium tartrate in an amount of about 0.2 molar has been found useful for this purpose.

Buffers are desired to maintain the electrolyte solution at a desired pH or pH range. For example, when hydrogen sulfide dissolves in the electrolyte it becomes acidic and it will dissolve a nickel cathode if the pH falls below about 4–5. Accordingly, use of a buffering agent to maintain the pH in excess of 5 is desired. A suitable buffer comprises a mixture of potassium dihydrogen phosphate and disodium hydrogen phosphate dihydrate in a ratio of 1.4/2.0, and in amounts of 1.4 and 2.0 millimolar, respectively.

Lastly, an additive to limit the evaporation of the water is desired. This may be accomplished by reduction of the partial pressure of water through increased electrolyte salt concentration, by the addition of a thickening agent such as agar, methyl cellulose and the like, or by the addition of a deliquescent salt. An example of the latter is the potassium dihydrogen phosphate employed in the above mentioned buffer.

What is claimed is:

1. An improved electrochemical device for determining the oxygen content of a fluid comprising a cathode, an anode, an electrolyte solution in electrical contact with said cathode and anode and in oxygen receiving contact with said fluid, and a gas-permeable membrane between said electrolyte and said fluid, wherein the improvement comprises a cathode composed of a metal sulfide selected from the group consisting of the sulfides of nickel, tungsten and cobalt.

2. A device according to claim 1 wherein said cathode is nickel sulfide.

3. A device according to claim 1 wherein said cathode is tungsten sulfide.

4. A device according to claim 1 wherein said cathode is cobalt sulfide.

5. A device according to claim 1 wherein said anode is silver.

6. A device according to claim 1 wherein said anode is silver sulfide.

7. An improved electrochemical device for determining the oxygen content of a fluid comprising a cathode, an anode, an electrolyte solution in electrical contact with said cathode and anode and in oxygen receiving contact with said fluid, a gas-permeable membrane between said electrolyte and said fluid, and means for applying a potenial across said anode and cathode, wherein the improvement comprises a cathode composed of a member selected from the group consisting of nickel and tungsten.

8. A device according to claim 7 whose anode is formed of a metal which, in contact with a sulfur-containing compound of the class consisting of hydrogen sulfide, sulfur dioxide and mercaptans, forms an electrically-conductive metal sulfide whose electrochemical properties are such that there is no significant change in the response characteristics of the device upon exposure of the device to said sulfur-containing compound.

9. A device according to claim 8 wherein said metal is silver.

10. A device according to claim 9 wherein said cathode is nickel.

11. A device according to claim 9 wherein said cathode is tungsten.

References Cited

UNITED STATES PATENTS

| 2,913,386 | 11/1959 | Clark | 204—195 P |
| 3,223,608 | 12/1965 | Hersch | 204—195 R |
| 3,622,488 | 11/1971 | Chand et al. | 204—195 P |

GERALD L. KAPLAN, Primary Examiner